United States Patent
Isaac et al.

[19]

[11] Patent Number: 6,016,459

[45] Date of Patent: Jan. 18, 2000

[54] ELECTRONIC ENGINE CONTROL SYSTEM HAVING NET ENGINE TORQUE CALCULATOR

[75] Inventors: Emad S. Isaac; Titus J. Iwaszkiewicz, both of Woodridge, Ill.

[73] Assignee: Navistar International Transportation Corp, Chicago, Ill.

[21] Appl. No.: 09/103,267

[22] Filed: Jun. 23, 1998

[51] Int. Cl.[7] .............................. F02D 41/14; F02D 43/04
[52] U.S. Cl. .......................... 701/102; 123/480; 123/436; 701/105
[58] Field of Search ................................... 701/105, 102; 123/435, 436, 480, 492, 493

[56] References Cited

U.S. PATENT DOCUMENTS

| | | | |
|---|---|---|---|
| 4,815,340 | 3/1989 | Iwatsuki et al. | 701/105 |
| 5,021,956 | 6/1991 | Yoshimura et al. | 701/105 |
| 5,056,487 | 10/1991 | Yamakado et al. | 123/435 |
| 5,121,820 | 6/1992 | Brown et al. | 701/105 |
| 5,156,128 | 10/1992 | Nakagawa | 123/435 |
| 5,176,118 | 1/1993 | Norota | 123/435 |
| 5,226,390 | 7/1993 | Nakagawa | 123/436 |
| 5,357,912 | 10/1994 | Barnes et al. . | |
| 5,445,128 | 8/1995 | Letang et al. | 123/436 |
| 5,638,790 | 6/1997 | Minowa et al. | 123/436 |
| 5,724,944 | 3/1998 | Minowa et al. | 123/436 |
| 5,765,527 | 6/1998 | Lehner et al. . | |

OTHER PUBLICATIONS

"HEUI Fuel System Operation", Brochure CGE 472–1, Navistar International Transportation Corp., Feb. 1995.

*Primary Examiner*—Willis R. Wolfe
*Assistant Examiner*—Hieu T. Vo
*Attorney, Agent, or Firm*—Dennis K. Sullivan; Jeffrey P. Calfa

[57] ABSTRACT

An electronic control (18) for a combustion engine that forms a portion of an automotive vehicle powertrain and has an output shaft for powering a drivetrain portion (14, 16, 17, 19) of the powertrain to propel the vehicle. The control has at least one ambient parameter variable input source representing a respective ambient parameter (EOT, BAP, AIT, and MAP) useful in deriving gross torque output of the combustion engine. The control also has at least one operating variable input source (EFC, ACD, DIT_ADJ) representing a respective operating parameter useful in deriving a reduction in gross torque output of the combustion engine due to operation of the combustion engine, and a processor for processing a respective signal correlated to the at least one ambient parameter variable input source and for processing a respective signal correlated to the at least one operating parameter variable input source to derive torque at the output shaft of the engine for powering the drivetrain to propel the vehicle.

17 Claims, 4 Drawing Sheets

6,016,459

ELECTRONIC ENGINE CONTROL SYSTEM HAVING NET ENGINE TORQUE CALCULATOR

FIELD OF THE INVENTION

This invention relates generally to electronic engine control systems. More particularly the invention relates to an electronic engine control system that develops and utilizes a data signal representative of net output torque being produced by a running engine. The invention is especially useful in the operation of internal combustion engines, such as diesel engines, that power vehicles, such medium and heavy trucks.

BACKGROUND AND SUMMARY OF THE INVENTION

The ability of an internal combustion engine to perform in a desired manner may at times depend on its ability to meet certain torque demands. It is known that the torque output of a representative internal combustion engine is speed-dependent over the range of speeds that the engine can develop. A general way to characterize performance of a particular engine model is by graph plots of torque vs. speed and horsepower vs. speed.

While a particular engine model may be representatively described by representative graph plots like those just mentioned, the mass-production usage of such an engine model will yield a universe of actual engines for any one of which actual graph plots like those just mentioned may depart from the representative ones. It is believed that engine and vehicle performance can be improved by utilizing data signals from the actual engine and vehicle to develop an engine net output torque data signal representing the input torque to the vehicle's drivetrain for propelling the vehicle.

The invention endows an electronic engine control system with an ability to develop a data signal that accurately represents engine net output torque produced by a running engine. It is believed that such a signal can be used to improve engine and vehicle performance. For example, an engine net output torque data signal may be used to provide better definition for transmission shift points, particularly automatic transmission shift points. Such a signal may also be a useful input to a vehicle traction control system. It may also serve as a useful diagnostic or maintenance tool.

The present invention relates to an electronic control system for an engine in which the electronic system develops an accurate engine net output torque data signal, based on the actual engine itself, recognizing, and taking into account, a number of various factors that may be different from engine to engine in mass-produced engines. It is believed that at least some of these factors may heretofore not have been perceived as significant in enabling engine and vehicle improvements to be attained.

One general aspect of the invention relates to an electronic control for a combustion engine that forms a portion of an automotive vehicle powertrain and has an output shaft for powering a drivetrain portion of the powertrain to propel the vehicle, the control comprising: at least one ambient parameter variable input source representing a respective ambient parameter useful in deriving gross torque output of the combustion engine; at least one operating variable input source representing a respective operating parameter useful in deriving a reduction in gross torque output of the combustion engine due to operation of the combustion engine; and a processor for processing a respective signal correlated to the at least one ambient parameter variable input source and for processing a respective signal correlated to the at least one operating parameter variable input source to derive torque at the output shaft of the engine for powering the drivetrain to propel the vehicle.

Another general aspect relates to an automotive vehicle comprising: a powertrain that includes a combustion engine having an output shaft powering a drivetrain to propel the vehicle; at least one ambient parameter variable input source representing a respective ambient parameter useful in deriving gross torque output of the combustion engine; at least one operating variable input source representing a respective operating parameter useful in deriving a reduction in gross torque output of the combustion engine due to operation of the combustion engine; a processor for processing a respective signal correlated to the at least one ambient parameter variable input source and for processing a respective signal correlated to the at least one operating parameter variable input source to derive torque at the output shaft of the engine for powering the drivetrain to propel the vehicle; and a utilization device in the drivetrain whose operation is controlled at least at times by the derived torque.

Still another general aspect relates to a method in a control for a combustion engine that forms a portion of an automotive vehicle powertrain and has an output shaft for powering a drivetrain portion of the powertrain to propel the vehicle, the method comprising: measuring at least one ambient parameter variable input representing a respective ambient parameter useful in deriving gross torque output of the combustion engine; measuring at least one operating variable input source representing a respective operating parameter useful in deriving a reduction in gross torque output of the combustion engine due to operation of the combustion engine; and deriving torque at the output shaft of the engine for powering the drivetrain to propel the vehicle by processing a respective signal correlated to the at least one ambient parameter variable input source and processing a respective signal correlated to the at least one operating parameter variable input source.

The foregoing, along with further aspects, features, and advantages of the invention, will be seen in this disclosure of a presently preferred embodiment of the invention depicting the best mode contemplated at this time for carrying out the invention. This specification includes drawings, now briefly described, followed by detailed description that will make reference to these drawings.

DESCRIPTION OF THE PREFERRED EMBODIMENT

Figure 1:
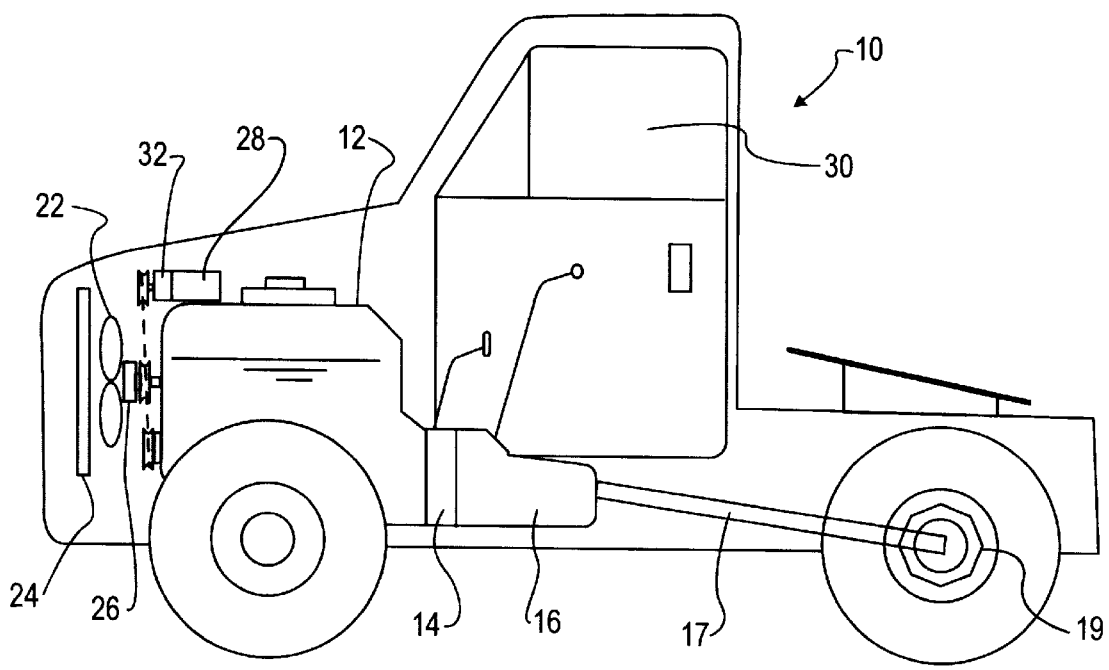
FIG. 1 is a side elevation view of an engine-powered vehicle having an electronic engine control system embodying principles of the present invention.

FIG. 1 illustrates an automotive vehicle 10, a medium or heavy truck for example, having a chassis containing a powertrain that includes an internal combustion engine 12, herein described as a diesel engine. Engine 12 has a crankshaft including a flywheel at which the engine develops engine net output torque for a drivetrain through which engine 12 propels the vehicle. The engine flywheel is operatively coupled to a multi-gear transmission 16, either through a clutch 14 in the case of a manually shifted transmission or through a torque converted in the case of an automatic transmission. The transmission is coupled by a driveshaft 17 to driven wheels of a rear axle assembly 19. The engine net output torque for propelling truck 10 is applied from the engine flywheel as an input to the clutch in the case of a manual transmission, and to the torque converter in the case of an automatic.

Figure 2:
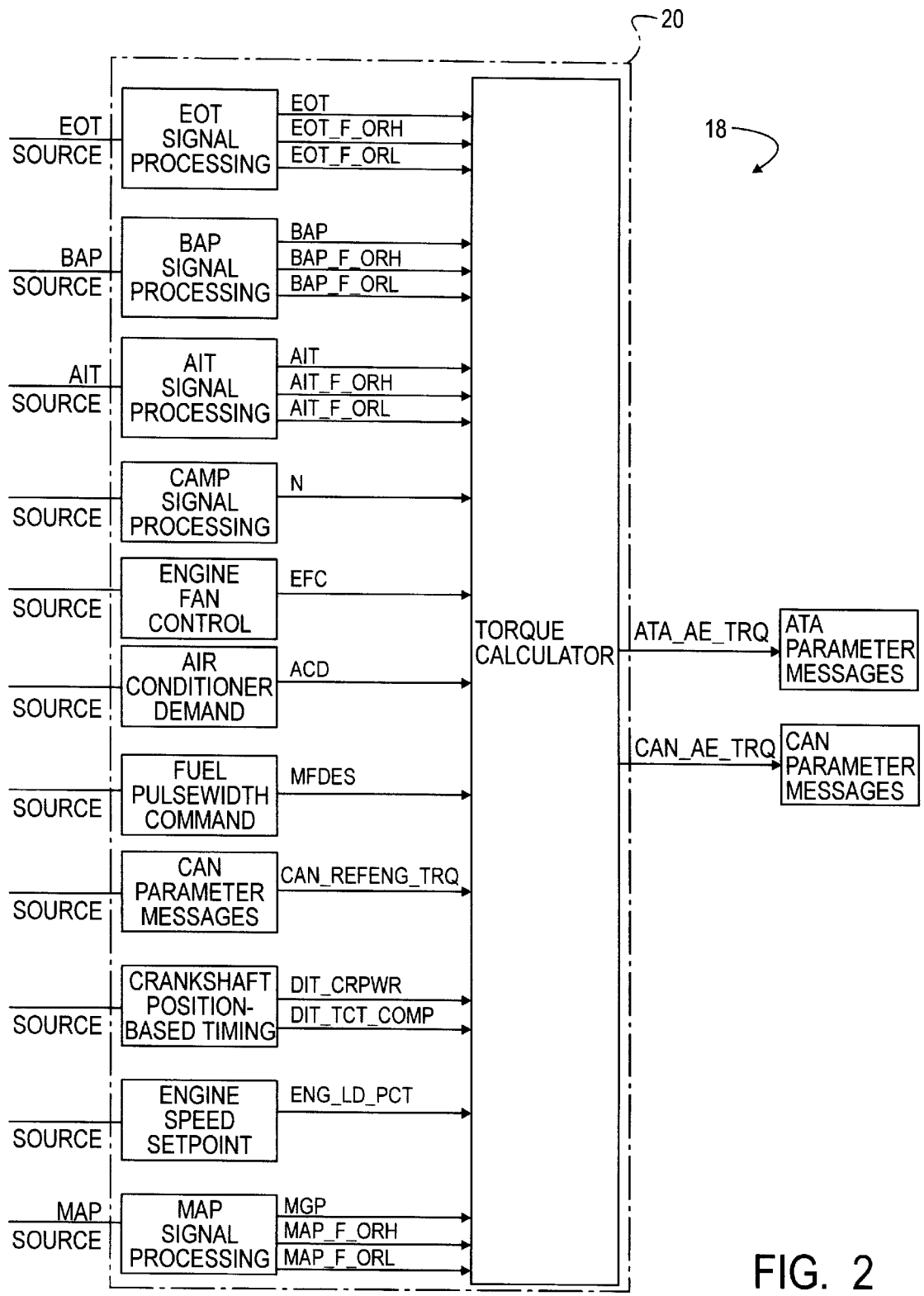
FIG. 2 is a general schematic hardware diagram of the electronic engine control system, including further detail related to the present invention.

Engine 12 is a fuel-injected diesel engine having individual fuel injectors that inject diesel fuel into the engine cylinders in properly timed relation to engine operation. An electronic engine control 18 that includes a microprocessor 20 is associated with engine 12 and schematically shown in FIG. 2. Control 18 utilizes various input data signal sources. Microprocessor 20 processes certain data signals in accordance with programmed algorithms to develop certain signals used in the performance of various functions associated with operation of engine 12 and truck 10. The signals processed by microprocessor 20 may be ones that originate at external sources (input variables) and/or signals that are generated internally by microprocessor 20 (local variables). Although microprocessor 20 is a hardware item, the reader should recognize that FIG. 2 is not intended to depict particular internal hardware architecture; hence the Figure shows several instances of signal processing ahead of processing that is designated as a torque calculator.

One of the many functions performed by engine control 18 is to control the timing of the fuel injections by issuing injection control signals that control the opening and closing of the fuel injectors. Control 18 develops these control signals by monitoring various input data signals and processing them in accordance with algorithms programmed in microprocessor 20.

One or more accessory devices may be powered by engine 12. FIG. 1 shows an engine fan 22 mounted at the front of engine 12 for drawing air through a radiator 24 of a cooling system for the engine. Engine 12 may have a pulley at the front of its crankshaft that is operatively coupled with fan 22 through a selectively engageable and disengageable fan drive 26. Fan drive 26 may comprises a solenoid-operated clutch that is under the control of engine control 18. When the clutch solenoid is energized, the clutch is engaged to place the fan in driven relationship to the engine crankshaft; when the clutch is not energized, the clutch is disengaged, placing the fan in non-driven relationship to the crankshaft. The engine control monitors various data signals to determine when fan drive 26 should be engaged and disengaged.

FIG. 1 shows a second accessory 28, namely an air-conditioning compressor, mounted near the front of engine 12 for cooling the interior of a driver's cab 30 of truck 10. The engine crankshaft is operatively coupled with compressor 28 through a selectively engageable and disengageable compressor clutch 32. Clutch 32 is solenoid-operated. When its solenoid is energized, clutch 32 is engaged to place compressor 28 in driven relationship to the engine crankshaft; when the solenoid is not energized, clutch 32 is disengaged, placing the compressor in non-driven relationship to the crankshaft. Clutch 32 is under the control of an air conditioning system for cab 30.

FIG. 2 shows a number of data signal inputs (representing input variables) to control 18. An EOT source provides a data signal that represents engine oil temperature; such a source may be a remote temperature sensor and some signal processing may occur before the torque calculator acts on the engine oil temperature. The engine oil temperature is used as an indication of engine operating temperature. A BAP source provides a data signal that represents barometric absolute pressure; such a source may be a remote barometric pressure sensor and some signal processing may occur before the torque calculator acts on barometric absolute pressure. An AIT source provides a data signal that represents air inlet temperature, which may be substantially ambient air temperature; such a source may be a remote temperature sensor and some signal processing may occur before the torque calculator acts on the air inlet temperature. An MGP source provides a data signal that represents engine boost pressure; such a source may be a remote manifold absolute pressure (MAP) sensor sensing intake manifold absolute pressure and some signal processing may occur before the torque calculator acts on the engine boost pressure.

The torque calculator also utilizes engine speed (rpm) as an input, represented by a signal N, which may be developed through processing crank angle signals from a corresponding sensor. An EFC signal is a binary logic signal indicating whether fan 22 is engaged with, or disengaged from, the engine crankshaft. An ACD signal is a binary logic signal indicating whether compressor 28 is engaged with, or disengaged from, the crankshaft. An MFDES signal represents fuel mass being injected into engine 12. Although the pulse widths of fuel injection command signals for pulsing the engine fuel injectors to cause fuel injections are representative of injected fuel masses, each pulse width by itself is a volume measurement and must be compensated for temperature before it can provide a true mass measurement of injected fuel. As will be more fully explained later, a DIT_CRPWR signal and a DIT_TCT_COMP signal are derived from the occurrence of certain vehicle operating conditions that are attended by certain changes, actual or incipient, in engine speed; they utilize crankshaft position-based timing as a source. An ENG_LD_PCT signal represents actual engine load as a percentage of maximum engine load.

Figure 3A:
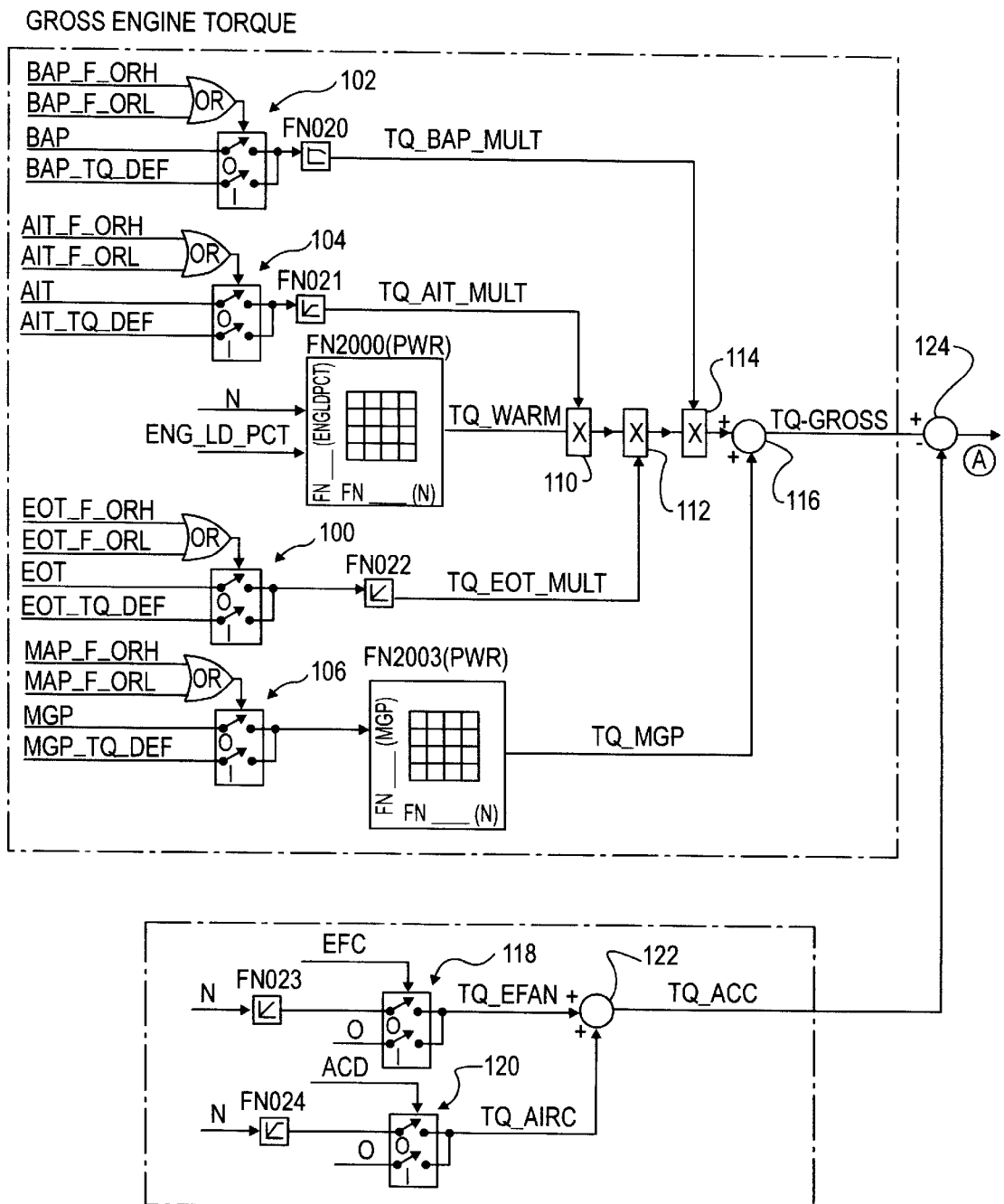
FIGS. 3A and 3B is a general schematic software diagram embodying principles of the present invention implementing engine net output torque calculation in the electronic engine control system.
Figure 3B:
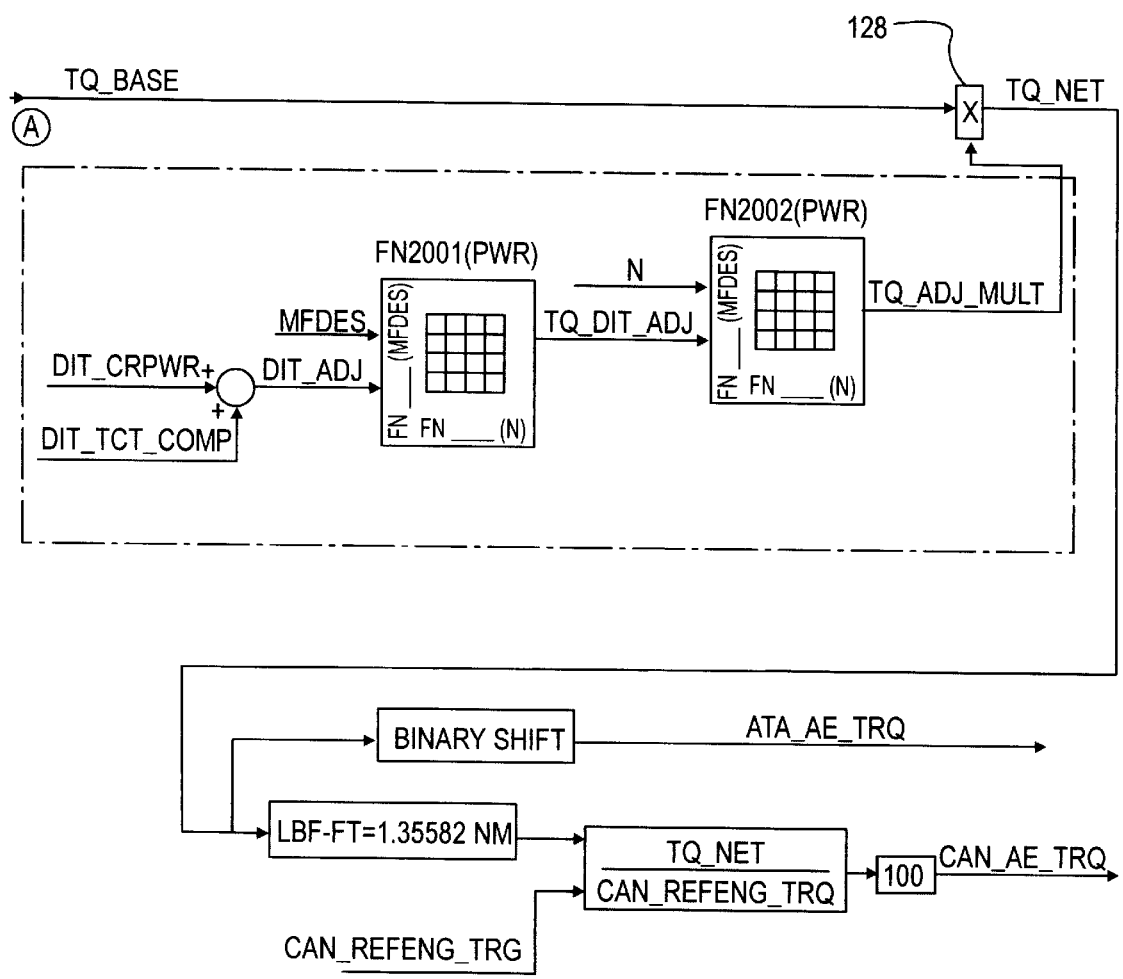

Microprocessor 20 processes these signals in accordance with FIGS. 3A and 3B to develop the signals ATA_AE_TRQ and CAN_AE_TRQ, which represent the value of present net engine output torque, and are broadcast over both an ATA data link and a CAN data link. In order to adapt microprocessor 20 for the particular engine model, data related to the engine model is programmed into the microprocessor through a CAN parameter messages port. The signal CAN_REFENG_TRQ represents a reference torque that is particular to that engine. The programming of engine model data for the particular engine may serve to program one or more of various function generators and/or look-up tables.

In order for the signals EOT, BAP, AIT, and MGP to be considered valid for processing by microprocessor 20, the value of each must lie within a respective predetermined range. Whenever anyone of these four signals falls outside the respective range, a respective fault flag is set and a respective default value is substituted and processed by microprocessor 20 instead of the actual value from the respective source. In FIG. 3A, the respective reference numerals 100, 102, 104, 106 indicate this screening of each of these four source signals. An actual EOT, BAP, AIT, or MGP signal is deemed valid, and therefore utilized in the engine net output torque calculation, only if it falls with a valid range for the respective signal. A respective "out of range high" signal, such as EOT_F_ORH in the case of signal EOT, and a respective "out of range low" signal, such as EOT_F_ORL, define the limits of each valid range. If a source, such as the EOT source, has a value outside its valid range, it is deemed invalid, in which case a default value signal, such as EOT_TQ_DEF in the case of signal EOT, is utilized for the engine net output torque calculation.

After screening, and any consequent substitution of a default value, each of the four signals forms an input for a respective function generator, or look-up table, FN020, FN021, FN022, and FN2003(PWR). As shown in FIGS. 3A, the first three of these utilize only a single input while the fourth FN2003(PWR) utilizes the signal N as a second input. Depending on the respective input values, the function generators, or look-up tables, supply respective output signals whose values are functionally related to the input values in accordance with the function generator or look-up table as the case may be.

The input variable signals ENG_LD_PCT and N are inputs to a further look-up table, FN2000(PWR), which produces a local variable output signal TQ_WARM whose value is functionally related to the two input values by the look-up table. The signal TQ_WARM represents the nominal torque that would be produced by a typical engine of the particular engine model when operating at a nominal temperature that is considered fully warmed up and at nominal values of barometric absolute pressure and air inlet temperature. Look-up table FN2000(PWR) therefore corresponds to a map containing a table of such torque values for corresponding engine speeds over the operating speed range of the engine.

Each of the respective function generators, FN020, FN021, and FN022 compensates the respective source for changes from its nominal value that have an influence on the torque produced by the engine. These compensated signals are TQ_BAP_MULT, TQ_AIT_MULT, and TQ_EOT_MULT.

The reference numerals 110, 112, and 114 designate successive multiplications of signal TQ_WARM by the respective local variable signals TQ_AIT_MULT, TQ_EOT_MULT, and TQ_BAP_MULT. These local variable signals are therefore in the nature of factors that are applied to nominal torque values generated by look-up table FN2000 at various engine speeds. In this way the torque calculation is compensated by departures of engine temperature, air temperature, and barometric pressure from nominal. The resulting product forms an input to an adder represented by the summing junction symbol 116.

The other signal input to summing junction 116 is the local variable signal TQ_MGP from look-up table FN2003 (PWR). That look-up table relates engine torque to engine boost at each of a number of different speeds spanning the range of engine speeds. The sum of the values of the two local signal inputs to summing junction 116 is designated TQ_GROSS, and it represents the gross output torque of engine 12.

In order to calculate the engine net output torque, further processing of engine gross output torque is required. Such processing includes the subtraction of accessory torque due to any operation of accessories, such as fan 22 and compressor 32, by engine 12. The respective reference numerals 118, 120 represent processing of data, including accessory operating parameters EFC and ACD, concerning these two accessories.

A respective function generator FN023, FN024 is associated with a respective accessory 22, 32 to correlate the accessory torque to engine speed over a range of engine speeds. If a respective accessory is engaged in driven relationship with the engine crankshaft, the output signal from the respective function generator FN023, FN024 is passed to a summing junction 122. The sum forms a local variable signal TQ_ACC which is subtracted from the signal TQ_GROSS at a subtraction junction 124 to yield a signal TQ_BASE which represents engine base torque. If an accessory is not engaged in driven relationship with engine 12, it does not result in a subtraction from the gross engine torque.

As shown in FIG. 3B, a further correction of the TQ_BASE signal is performed by an operating condition torque adjustment. This correction is performed using two look-up tables, FN2001(PWR) and FN2002(PWR). The values of two data signals DIT_CRPWR and DIT_TCT_COMP are added together at a summing junction 126, and the result is an input DIT_ADJ to look-up table FN2001 (PWR). Because of the nature of each signal, to be explained below, it is typical that at any given time, at most only one of them is of any consequence insofar as having an effect on the torque calculator.

The other input to look-up table FN2001(PWR) is signal MFDES. The output of look-up table FN2001(PWR) is a signal TQ_DIT_ADJ input to look-up table FN2002 (PWR). The other input to look-up table FN2002(PWR) is the engine speed signal N. The output of look-up table FN2002(PWR) is a signal TQ_ADJ_MULT.

Operating condition torque adjustment takes into account fuel injection timing offsets due to changes occurring as a result of particular operating modes. The signal DIT_CRPWR represents the effect of the vehicle being operated in cruise control mode where injector timing offsets may occur in order to maintain a set vehicle speed. The signal DIT_TCT_COMP represents the effect of transients such as may occur when the vehicle is being throttled down or up in a manner necessitating injector timing offsets. Multiplication of the two signals TQ_ADJ_MULT and TQ_BASE, as indicated by the reference numeral 128, yields the signal TQ_NET, which is thereafter properly dimensioned for broadcast on the respective data links ATA and CAN. Dimensioning can provide actual torque in desired units of measurement and/or percentage of reference torque. Microprocessor 20 may operate to perform the torque calculation routine at a rate of 20 hz.

While a presently preferred embodiment of the invention has been illustrated and described, it should be appreciated that principles of the invention are applicable to all embodiments and uses that fall within the scope of the following claims.

What is claimed is:

1. An automotive vehicle comprising:
    a powertrain that includes a combustion engine having an output shaft powering a drivetrain to propel the vehicle:
        at least one ambient parameter variable input source representing a respective ambient parameter useful in deriving gross torque output of the combustion engine;
        at least one operating variable input source representing a respective operating parameter useful in deriving a reduction in gross torque output of the combustion engine due to operation of the combustion engine;
        a processor for deriving net torque output of the combustion engine at the output shaft of the engine for powering the drivetrain to propel the vehicle by processing at least a respective signal correlated to the at least one ambient parameter variable input source to derive gross torque output of the combustion engine, processing at least a respective signal correlated to the at least one operating parameter variable input source to derive a reduction in gross torque output of the combustion engine due to operation of the combustion engine, and processing the derived gross torque output and the derived reduction in gross torque output to derive the net torque output; and a utilization device in the drivetrain whose operation at least at times utilizes the derived net torque output.

2. An automotive vehicle as set forth in claim 1 in which the utilization device comprises a multi-gear transmission.

3. An automotive vehicle as set forth in claim 1 in which the utilization device comprises a traction control mechanism.

4. An electronic control for a combustion engine that forms a portion of an automotive vehicle powertrain and has an output shaft for powering a drivetrain portion of the powertrain to propel the vehicle, the control comprising:

at least one ambient parameter variable input source representing a respective ambient parameter useful in deriving gross torque output of the combustion engine;

at least one operating variable input source representing a respective operating parameter useful in deriving a reduction in gross torque output of the combustion engine due to operation of the combustion engine; and a processor for deriving net torque output of the combustion engine at the output shaft of the engine for powering the drivetrain to propel the vehicle by processing at least a respective signal correlated to the at least one ambient parameter variable input source to derive gross torque output of the combustion engine, processing at least a respective signal correlated to the at least one operating parameter variable input source to derive a reduction in gross torque output of the combustion engine due to operation of the combustion engine, and processing the derived gross torque output and the derived reduction in gross torque output to derive the net torque output.

5. An electronic control as set forth in claim 4 in which the at least one operating variable input source representing a respective operating parameter useful in deriving a reduction from gross torque output of the combustion engine due to operation of the combustion engine comprises an accessory powered by the engine, and the respective signal correlated to the at least one operating parameter variable input source comprises a signal correlated to the accessory.

6. An electronic control as set forth in claim 5 in which the accessory comprises an air conditioner compressor.

7. An electronic control as set forth in claim 5 in which the accessory comprises a fan for drawing air through a radiator of a cooling system for the engine.

8. An electronic control as set forth in claim 4 in which the engine comprises a fuel injection system that is under the control of the electronic control, and the respective signal correlated to the at least one operating parameter variable input source comprises a signal correlated to fuel injection timing offsets.

9. An electronic control as set forth in claim 4 in which the respective signal correlated to the at least one ambient parameter variable input source comprises a respective signal correlated to engine operating temperature.

10. An electronic control as set forth in claim 4 in which the respective signal correlated to the at least one ambient parameter variable input source comprises a respective signal correlated to barometric absolute pressure.

11. An electronic control as set forth in claim 4 in which the respective signal correlated to the at least one ambient parameter variable input source comprises a respective signal correlated to inlet air temperature.

12. An electronic control as set forth in claim 4 in which the respective signal correlated to the at least one ambient parameter variable input source comprises a respective signal correlated to manifold absolute pressure.

13. An electronic control as set forth in claim 4 in which there are plural ambient parameter variable input sources which provide respective signals correlated respectively to engine operating temperature, barometric absolute pressure, inlet air temperature, and manifold absolute pressure, the respective signal correlated to the at least one ambient parameter variable input source comprises respective signals correlated to engine operating temperature, barometric absolute pressure, inlet air temperature, the at least one operating variable input source representing a respective operating parameter useful in deriving a reduction from gross torque output of the combustion engine due to operation of the combustion engine comprises an accessory powered by the engine, and the respective signal correlated to the at least one operating parameter variable input source comprises a signal correlated to the accessory.

14. An electronic control as set forth in claim 13 in which the processor contains a reference torque that is particular to the engine, the processor multiplies that reference torque by the respective signals correlated respectively to engine operating temperature, barometric absolute pressure, and inlet air temperature to obtain a product, and the processor subtracts the signal correlated to the accessory from that product to thereby obtain a result.

15. An electronic control as set forth in claim 14 in which one of the plural ambient parameter variable input sources comprises an intake manifold absolute pressure sensor, the respective signal correlated to the at least one ambient parameter variable input source comprises a signal correlated to intake manifold absolute pressure, and the processor adds the signal correlated to intake manifold absolute pressure to the product thereby adding to the result.

16. An electronic control as set forth in claim 15 in which the engine comprises a fuel injection system that is under the control of the electronic control, the respective signal correlated to the at least one operating parameter variable input source comprises a signal correlated to fuel injection timing offsets, and the processor multiplies the result by the signal correlated to fuel injection timing offsets.

17. In a control for a combustion engine that forms a portion of an automotive vehicle powertrain and has an output shaft for powering a drivetrain portion of the powertrain to propel the vehicle, the method which comprises:

measuring at least one ambient parameter variable input representing a respective ambient parameter useful in deriving gross torque output of the combustion engine;

measuring at least one operating variable input source representing a respective operating parameter useful in deriving a reduction in gross torque output of the combustion engine due to operation of the combustion engine; and deriving net torque at the output shaft of the engine for powering the drivetrain to propel the vehicle by processing at least a respective signal correlated to the at least one ambient parameter variable input source to derive gross torque output of the combustion engine, processing at least a respective signal correlated to the at least one operating parameter variable input source to derive a reduction in gross torque output of the combustion engine due to operation of the combustion engine, and processing the derived gross torque output and the derived reduction in gross torque output to derive the net torque output.

* * * * *